United States Patent [19]

Levin et al.

[11] Patent Number: 4,770,492
[45] Date of Patent: Sep. 13, 1988

[54] PRESSURE OR STRAIN SENSITIVE OPTICAL FIBER

[75] Inventors: Philip S. Levin, West Willington, Conn.; Patrice A. Svetaka, North Brookfield, Mass.

[73] Assignee: SpecTran Corporation, Sturbridge, Mass.

[21] Appl. No.: 924,093

[22] Filed: Oct. 28, 1986

[51] Int. Cl.$^4$ .............................................. G02B 6/02
[52] U.S. Cl. ............................. 350/96.29; 350/96.33
[58] Field of Search ............. 350/96.29, 96.23, 96.31, 350/96.33

[56] References Cited

U.S. PATENT DOCUMENTS

| | | | |
|---|---|---|---|
| 4,067,642 | 1/1978 | King et al. ............... | 350/96 WG |
| 4,078,432 | 3/1978 | Stewart .................... | 73/705 |
| 4,148,560 | 4/1979 | Margolis .................. | 350/96.23 |
| 4,158,310 | 6/1979 | Ho ........................... | 73/705 |
| 4,210,029 | 7/1980 | Porter ...................... | 73/705 |
| 4,295,738 | 10/1981 | Meltz et al. .............. | 356/32 |
| 4,300,816 | 11/1981 | Snitzer et al. ........... | 350/96.33 |
| 4,342,907 | 8/1982 | Macedo et al. ......... | 250/227 |
| 4,360,247 | 11/1982 | Beasley ................... | 350/96.15 |
| 4,363,533 | 12/1982 | Stowe et al. ............. | 350/96.23 X |
| 4,368,645 | 1/1983 | Glenn et al. ............. | 73/705 |
| 4,435,040 | 3/1984 | Cohen et al. ............ | 350/96.33 |
| 4,439,007 | 3/1984 | Lazay et al. ............. | 350/96.30 |
| 4,447,125 | 5/1984 | Lazay et al. ............. | 350/96.30 |
| 4,487,206 | 12/1984 | Aagard .................... | 128/667 |
| 4,495,819 | 1/1985 | Tekippe ................... | 73/705 |
| 4,518,857 | 5/1985 | McMahon et al. ..... | 250/225 |
| 4,524,436 | 6/1985 | Hall et al. ................ | 367/169 |
| 4,530,078 | 7/1985 | Lagakos et al. ......... | 367/149 |
| 4,554,837 | 11/1985 | Danby et al. ............ | 73/705 |
| 4,555,949 | 12/1985 | Danby et al. ............ | 73/705 |
| 4,555,950 | 12/1985 | Danby et al. ............ | 73/705 |
| 4,577,100 | 3/1986 | Meltz et al. .............. | 250/231 P |

OTHER PUBLICATIONS

Hecht, Jeff, *High Technology*, "Fiber Optics Turns to Sensing," pp. 49-56, (Jul./Aug.).
Lagakos, N. et al., *Applied Optics*, "Multimode Optical Fiber Displacement Sensor," vol. 20, (2), pp. 167-168, (Jan. 1981).
*Lasers and Applications*, "Buried Fiberoptic Cable will Detect Intruders," p. 32, (Jul. 1983).

*Primary Examiner*—Gene Wan
*Assistant Examiner*—James Lee
*Attorney, Agent, or Firm*—Pennie & Edmonds

[57] ABSTRACT

Pressure or strain sensitive optical fiber having a core, at least a portion of which has a predetermined refractive index for transmitting light therethrough, a cladding adjacent the core having a refractive index which is less than that of the core, and a concentric light transmissive layer adjacent the cladding having a refractive index which is greater than that of the cladding. The light transmissive layer has an internal diameter which is greater than the unperturbed mode boundary diameter of the core, such that all light passes through the core when the fiber is unperturbed. When the optical fiber is subjected to pressure forces in the form of stress or strain, light passes through the light transmissive layer in proportion to the amount of stress or strain acting upon the fiber. Also, pressor sensors and methods for measuring forces or pertubations utilizing such optical fiber.

28 Claims, 7 Drawing Sheets

Single Mode Fiber

Multimode Fiber

FIG. 1A (Prior Art)

Single Mode Fiber        Multimode Fiber

FIG. 1B

Single Mode Fiber        Multimode Fiber

Effects of Design Parameters on Fiber Senior Performance for fixed a and $\Delta Na$

FIG. 3

Depressed Clad Sensor

FIG. 4

Deeply Depressed Clad Sensor

FIG. 5

"W"-Type Sensor

FIG. 6

Multiple Clad Sensor

FIG. 7

Multiply Clad Sensor

PRESSURE OR STRAIN SENSITIVE OPTICAL FIBER

TECHNICAL FIELD

The invention relates generally to an optical waveguide having at least two concentric cores arranged in such a manner that, upon an application of pressure on the waveguide, light is coupled between adjacent cores, thereby allowing the waveguide to act as a pressure sensor.

BACKGROUND ART

Optical waveguides are well known in the art, and devices incorporating optical waveguides have been employed in many different fields as communicators, sensors and monitors. An optical waveguide typically consists of a dielectric core fabricated from a material having a certain refractive index, surrounded by a second material having a lower refractive index. This surrounding material is generally known as the cladding. A beam of light is guided by this composite structure as long as the refractive index of the core material exceeds the refractive index of the cladding material. A light beam within the core is guided generally along the core axis by reflection at the boundary between the core and cladding.

A number of different designs for optical waveguides have been developed including the multimode step index profile, the single mode step index profile, and the multimode graded index profile. Where single mode transmission is desired, the single mode optical waveguide is used. In such a waveguide, the diameter of the core is typically less than 10 μm and the difference between the refractive indices of the cores and the cladding is on the order of $10^{-3}$ to $10^{-2}$. At wavelengths which are longer than a critical wavelength, called the $LP_{11}$ cutoff wavelength, only the lowest order optical mode will be supported in such a waveguide.

Optical fibers have also been fabricated which include multiple cores disposed in numerous different arrays and positioned within a common cladding. One such disclosure is contained in U.S. Pat. No. 4,148,560. This disclosure is directed toward an assembly including a plurality of fibers embedded in an encapsulating material. This particular patent shows an optical bundle positioned between two reinforcing wires and embedded in a protective sheath of plastic material.

The phenomenon known as cross-talk between cores in a common cladding occurs when the light energy propagating along one core is coupled to an adjacent core. This occurs because, as is known, the propagating optical energy is not totally confined by the boundary between the core and cladding but, in fact, it penetrates to a degree into the cladding.

U.S. Pat. No. 4,295,738 discloses a pressure sensitive optical waveguide comprising multiple, nonconcentric cores formed in a manner that cross-talk between adjacent cores is primarily a function of the strain or hydrostatic pressure applied to the waveguide.

Also known are multiple clad fibers such as those disclosed in U.S. Pat. No. 4,435,040; however, all of the concentric, guiding layers of this and similar patents are configured to interact with the mode field diameter of the optical power distribution passing through the unperturbed fiber. For this reason, these waveguides cannot be utilized for detecting pressure variations on the fiber. The intent and purpose of such multiply clad fibers is to alter the optical dispersion characteristics of the waveguide. Optical dispersion affects the information carrying capacity or bandwidth of a fiber.

SUMMARY OF THE INVENTION

The invention relates to pressure sensitive optical fiber, comprising core means at least a portion of which has a predetermined refractive index for transmitting light therethrough, cladding means adjacent the core means having a refractive index which is less than that of the core means portion, and concentric light transmissive means adjacent the cladding means having a refractive index which is greater than that of the cladding means and through which light passes in proportion to the amount of stress or strain induced in the fiber.

The light transmission means preferably has an internal diameter greater than the unperturbed mode boundary diameter of the core means, which can comprise single mode or multimode optical fiber, with or without means for adjusting or altering modal, waveguide and/or chromatic dispersion. The core and cladding means can include step index, graded index, depressed clad, deeply depressed clad, W-type or multiple clad single mode optical fiber, and the fiber may include means for transferring analog and/or digital data. If desired, the light transmissive means may include a plurality of concentric light transmissive layers.

The invention also relates to a pressure sensor comprising the pressure sensitive optical fiber described above, with means for introducing optical power into one end of the optical fiber, and means for detecting the optical power at the opposite end of the optical fiber.

The detecting means can include means for measuring the decrease in optical power in the core means, means for measuring the increase in optical power in the light transmissive means, or both. The sensor may include means for converting or amplifying any external force to bending forces on the fiber. Also, the sensor may include at least one coating on the optical fiber to vary the sensitivity of the fiber.

The invention also relates to a method for detecting pressure or force pertubations which comprises preparing the pressure sensitive optical fiber or pressure sensors described above, applying a light source at one end of the sensor, subjecting the sensor to hydrostatic or other pressure or strain, and measuring at least one of core means optical power decrease, or light transmissive means optical power increase, thereby detecting pressure or strain variations on the fiber or sensor. The sensitivity of the sensor can be varied by changing at least one of attenuation coefficient, refractive index, or width of the core means or light transmissive means, or the distance between the light transmissive means and core means.

BRIEF DESCRIPTION OF THE DRAWINGS

The foregoing and other features and advantages of the present invention will become more apparent from the following description of the preferred embodiments illustrated by the accompanying drawings, where.

FIG. IA is a cross sectional view of the well known single and multimode step index optical fiber, along with their respective refractive index profiles.

FIG. IB is a cross sectional view of pressure sensitive optical fibers according to the invention along with their respective refractive index profiles.

DETAILED DESCRIPTION OF THE PREFERRED EMBODIMENTS

The present invention generally relates to a novel design for optical fibers which are sensitive to micro and macrobending forces. The design may be applied to single mode as well as multimode fibers. In the case of single mode fibers, it is possible to designate a pressure sensitive passband and a relatively pressure-insensitive passband in the same fiber thus allowing simultaneous multi-functions (analog or digital communications or data transfer) on one passband and pressure detection on the second passband.

The sensed pressure is proportional both to the fractional reduction in transmitted core power and the increase in optical power in the concentric region. If desired, both the power reduction in the core and the increase in the concentric region can be measured for greater accuracy. Well defined design parameters can be adjusted to pre-select the dynamic range of these pressure sensors.

Figure 1A:
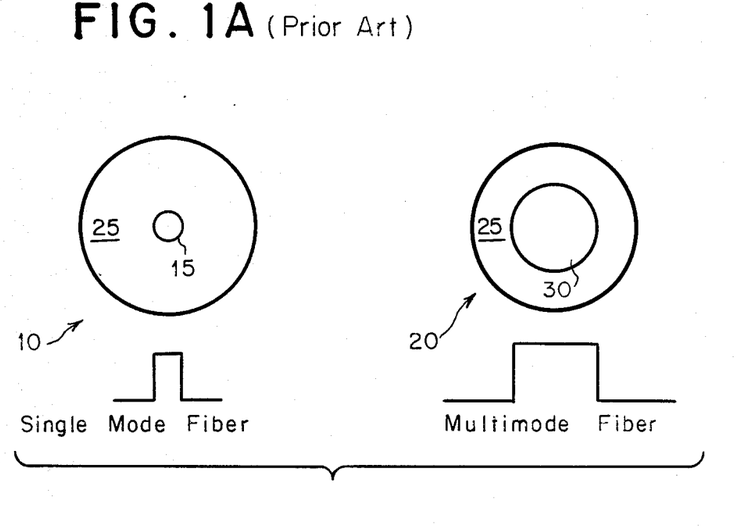

Referring initially to FIG. 1A, there are illustrated cross sections of two well known optical fibers. The cross section of a single mode step index fiber 10 and of a multimode step index fiber 20 are shown along with their respective refractive index profiles. In the case of the single mode fiber, a single narrow core 15 having a relatively high index of refraction and being on the order of a few microns in diameter is provided within a cladding 25. In the multimode fiber, a similar cladding (designated by the same numeral 25) is utilized but the core material 30 is typically of a much larger diameter than that of single mode fiber. Thus, the multimode fiber enables a larger mode volume to pass through the fiber.

Figure 1B:
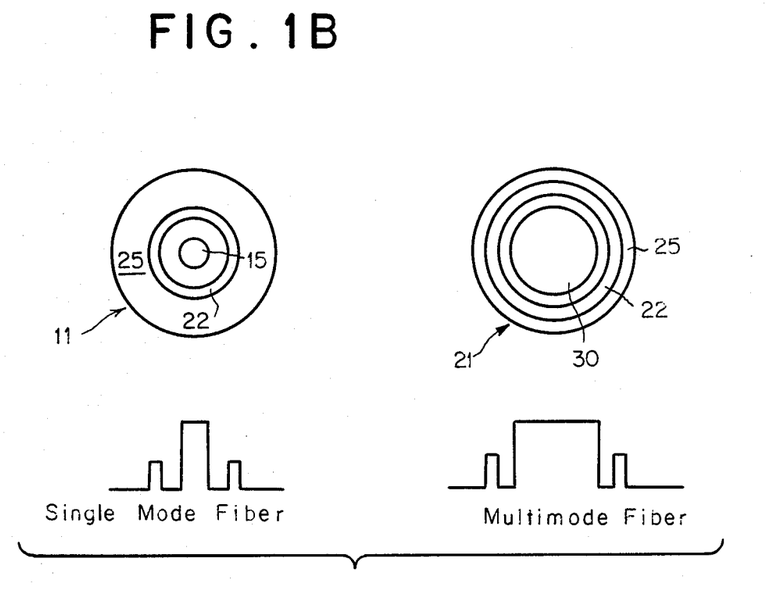

FIG. 1B illustrates the pressure sensitive optical fiber according to the present invention, for both single mode 11 and multimode step index fiber 21. The core and cladding for these fibers are the same as those of FIG. 1A; however, as shown, the provision of a concentric light transmissive layer 22 enables perturbations or other applications of force on the fiber to be measured, since light will pass through the concentric layer in proportion to the amount of stress or strain induced in the fiber.

Figure 2A:
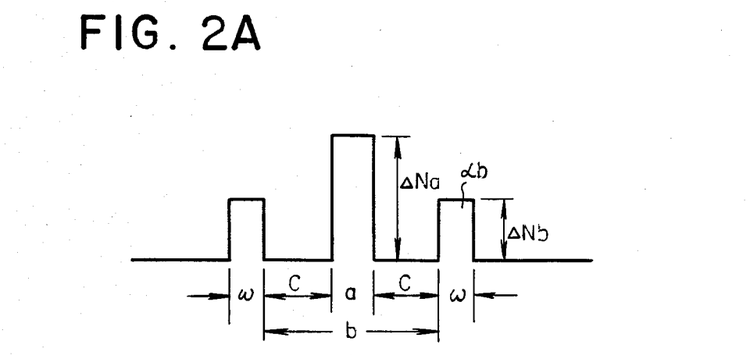
FIG. 2A illustrates the refractive index profile and design parameters for a single mode fiber of the invention.

FIG. 2A illustrates the major design parameters for an embodiment of the single mode optical fiber of the invention. These design parameters are $\Delta N_a$ and $\Delta N_b$, the index differences between concentric regions, respectively; a and w, the width of the core and the concentric regions, respectively; c, the separation between the core and the concentric region; and $\alpha b$ the optical absorbance cf the concentric region.

Figure 2B:
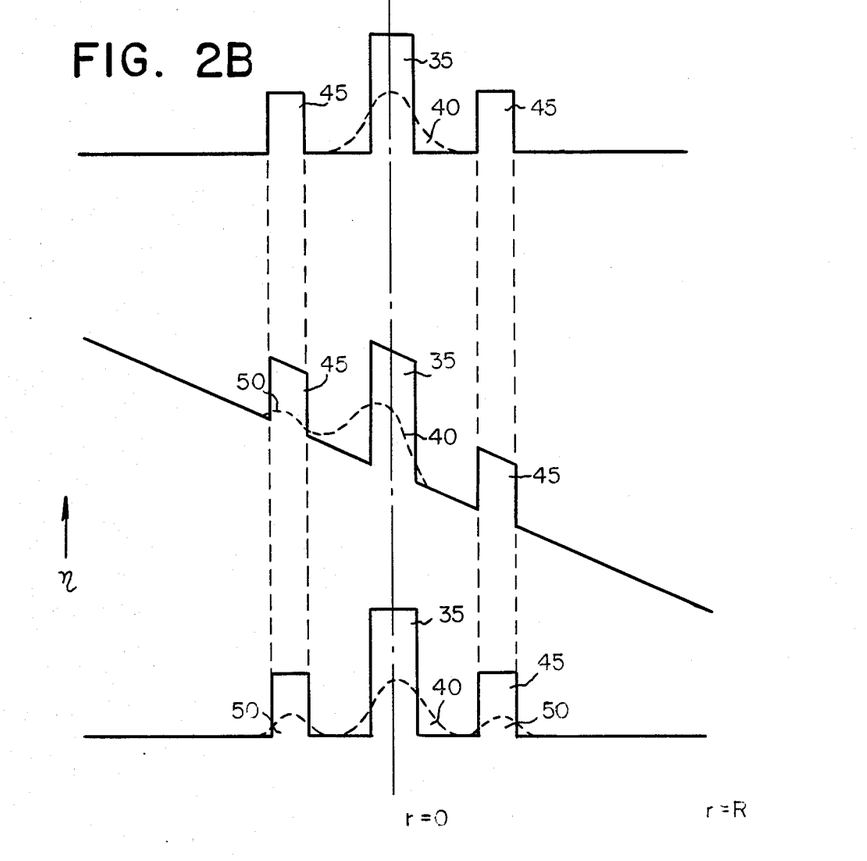
FIG. 2B illustrates refractive index profiles of the initial, perturbed, and final conditions, respectively, and the corresponding optical power distributions of an optical fiber pressure sensor according to the present invention.

FIG. 2B illustrates the refractive index profile for an optical fiber pressure sensor according to the present invention which utilizes a single mode fiber. The refractive index of the core material 35 is depicted and the dashed line 40 indicates the normalized distribution of the optical power passing therethrough. This normalized distribution is known as the mode field and it is generally accepted that the mode field diameter is measured from the $-3$ dB down points of tee peak of the power distribution. Thus, in the normal operation of the fiber, the distribution of light is substantially limited to the immediate vicinity of the high refractive index core material 35. When a perturbation is applied to the fiber, such as by bending or other application of pressure, force or strain (a macrobend is depicted with the left side of the drawing indicating that the fiber is in compression while the right side indicating that if is in tension), the light distribution is partially shifted and a portion 50 encounters the concentric light transmissive layer 45. Now at the exit end of the pressure sensor, the core contains an amount of light having a lower optical power than it does at the entrance to the sensor with the difference appearing in the light transmissive layer 45 as optical power 50. This illustrates how the sensor can be used to measure the amount of pressure or strain on the sensor because the reduction in optical power in the core or the gain in the light transmissive layer 45 can be measured and is representative of force applied to the sensor. Either the light loss of the core or the gain in the outer layer can be measured as noted above, or, for accuracy, both can be measured and compared.

Figure 2C:
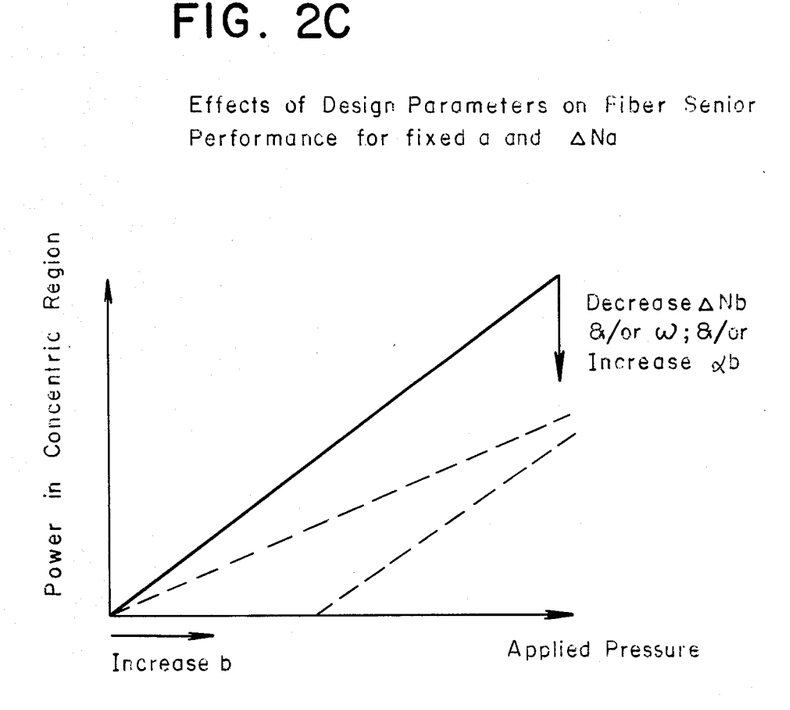
FIG. 2C is a graphical illustration of the interrelationship of the property parameters of the optical fiber of the invention.

In analogy with traditional sensors, the parameters $\Delta N_b$, W, and $\alpha b$ determine the "gain" of the fiber sensor and the parameter b determines the "zero" of the sensor. That is, the onset of power increase in the concentric region is determined by its proximity to the core region. The extent of power increase in the core for a given bending perturbation and given core parameters is determined by the index elevation, width, and attenuation characteristics of the concentric region. Linearity is a function of the shapes of the core and concentric regions. The interrelation of some of these parameters is shown in FIG. 2C.

This fiber sensor has three spectral bands of particular interest. Above the $LP_{II}$ cutoff wavelength the fiber exhibits a pressure sensitive band wherein the attenuation of optical power is proportional to the sensed pressure. This is the regime wherein the fundamental mode may be biased, by bending perturbations, to couple into the concentric region. At or near the $LP_{II}$ cutoff wavelength, the $LP_{01}$ mode is tightly bound and the "zero" of the sensor may be positioned such that ordinary bending perturbations are insufficient to force coupling between the fiber core and the concentric region. This spectral band is therefore relatively pressure insensitive. Below the $LP_{11}$ cutoff wavelength, the fiber is no longer singlemode.

In a wavelength division multiplexed system, this fiber would allow analog or digital communications or data transfer in the relatively pressure insensitive passband while simultaneously passing pressure information in the pressure sensitive passband.

In the single mode pressure sensor embodiment of the invention, the refractive index profile of any single mode fiber design (step index, W-type, depressed clad, dispersion shifted, etc.) is modified by the addition of a special concentric region. This secondary region comprises a refractive index which is greater than the average or effective index of that part of the fiber which lies between the core and the secondary region. The concentric region is situated radially such that the fundamental modes, which in the unperturbed condition are guided by the central core region, can be induced to couple into the concentric region by means of macro- and/or microbending of the fiber. The extent of coupling is a function of the extent of the induced macro- and microbending. Lateral pressure on optical fibers will produce macro- and microbending under a variety of conditions. Thus, this fiber may be used separately or in combination with other components as a pressure sensor.

Figure 3:
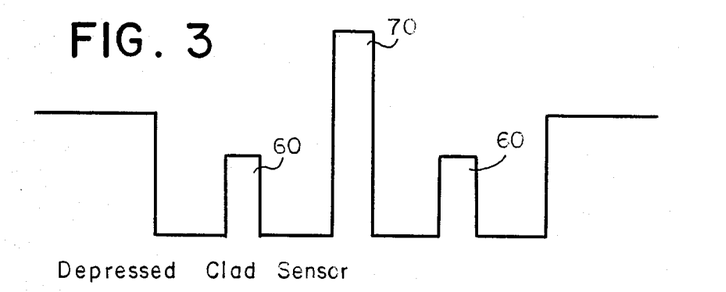
FIGS. 3 through 10 are refractive index profiles for eight additional embodiments of the invention relating to single mode optical fiber pressure sensors.
Figure 4:
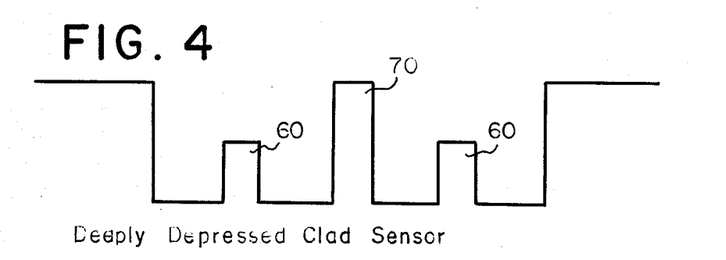
Figure 5:
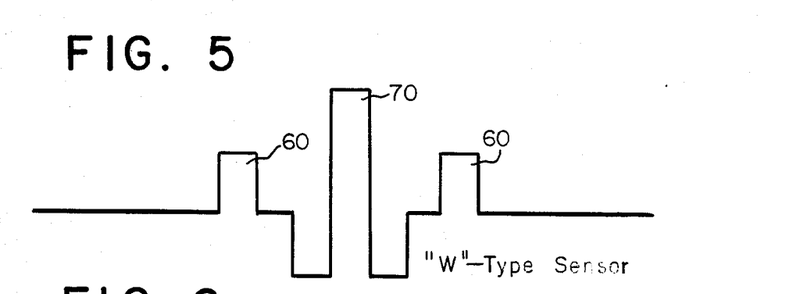

FIGS. 3–5 illustrate different types of optical fiber which can be used in accordance with the teaching of the invention. In these figures, the light transmissive concentric layer of the invention is designated as 60, with the core generally indicated as 70.

Figure 6:
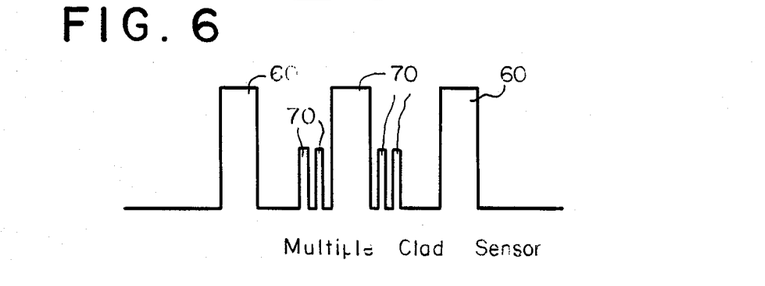
Figure 7:
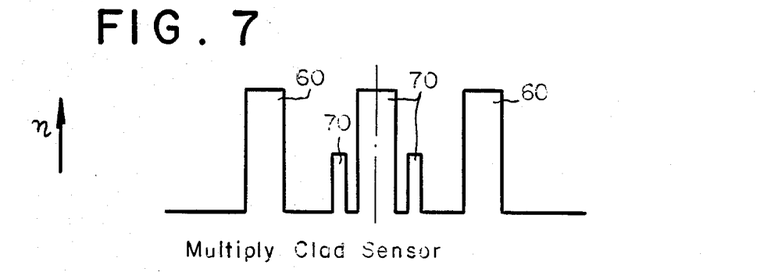

FIGS. 6 and 7 illustrate optical sensors which utilize special cores that can be used to adjust the dispersion of the light passing therethrough. As illustrated therein, that special type of core can also be used in accordance with the teachings of the present invention.

One skilled in the art would realize that the spacing of the light transmissive layer with respect to the core is important to determine the sensitivity of the fiber to pressure. Thus, it is possible to make extremely highly sensitive fiber by maintaining the spacing (c in FIG. 2) of the pressure sensitive light transmissive layer at a minimum distance from the mode field diameter, while large spacings can be used for less sensitive pressure detection applications.

The concentric region is also situated radially such that the propagation of light within this concentric region may or may not be substantially attenuated along the length of the fiber, depending upon the application. Attenuation of light coupled into the concentric region may be maximized by, for example, adding absorbing or scattering materials to that region or placing the concentric region in proximity with a lossy (absorbing or scattering) region.

Figure 8:
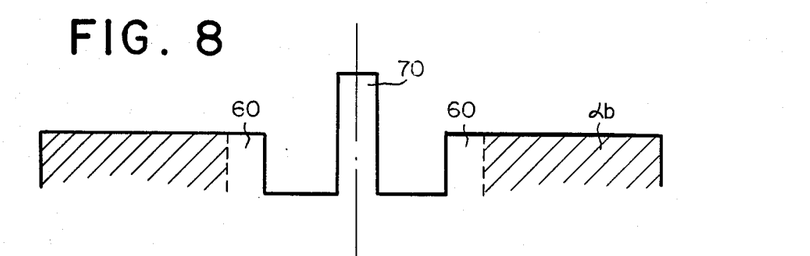
Figure 9:
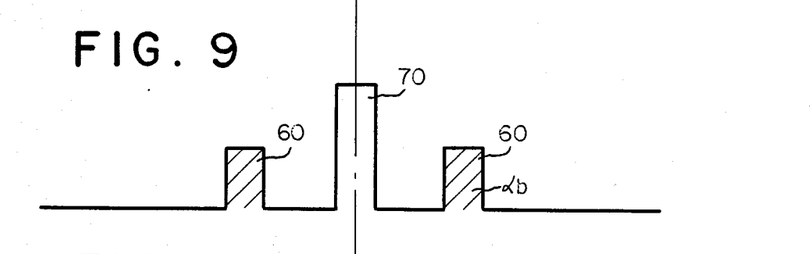
Figure 10:
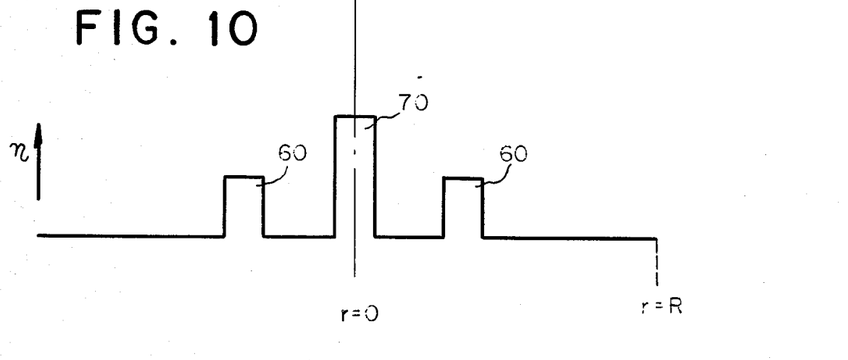

FIGS. 8–10 illustrate further embodiments of the invention. In FIG. 8, a high quality light transmissive concentric region is used in proximity with a high loss region, as mentioned above.

FIG. 9 illustrates a highly absorbing or scattering concentric region which can be used for minimizing the transmission in the outer layer.

Alternatively, the attenuation of light coupled into the concentric region may be minimized by fabricating the region with the same high quality materials and the same design principles which are used to design low loss core regions. For example, the concentric region could comprise an elevated refractive index of limited radial extent bounded by a low loss cladding material, as illustrated in FIG. 10.

For the multimode pressure sensor embodiment, the parameters b, $\Delta Nb$, W, and $\alpha_b$ for the concentric region will contribute to a determination of the zero and gain of the sensor as described for the single mode sensor. The concentric region may also be either maximally attenuating or minimally attenuating, depending upon the design requirements.

Figure 11:
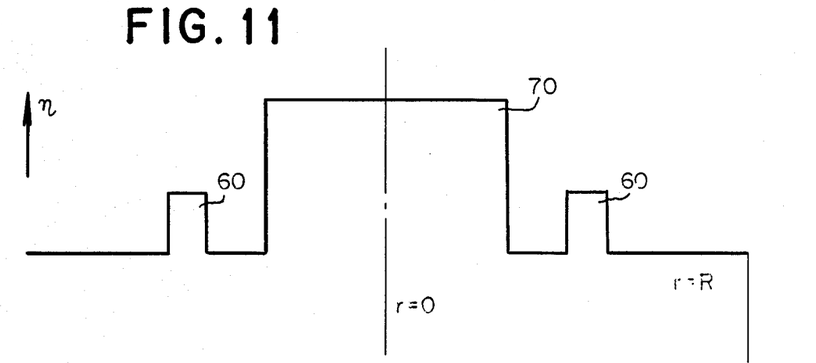
FIGS. 11 and 12 are refractive index profiles for further embodiments of the invention relating to multimode optical fiber pressure sensors.
Figure 12:
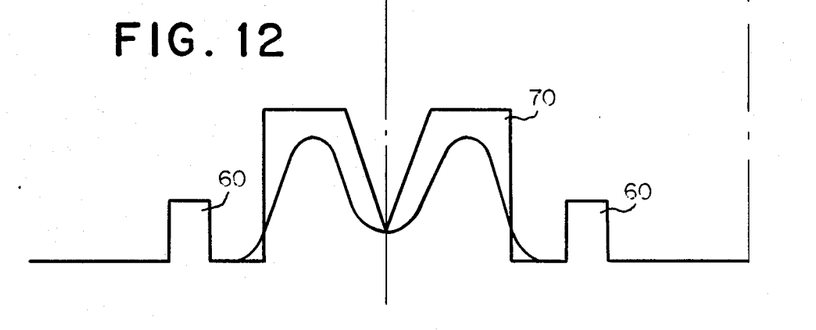

FIG. 11 illustrates a step index multimode optical fiber having a pressure sensitive concentric region, while FIG. 12 illustrates an optical fiber with an index profile of adjusted higher order mode power fraction. These alternate embodiments are also considered within the scope of the claims of this invention.

Modifications of the core refractive index profile which enhance the pressure sensitivity (i.e. enhance coupling of the fiber's higher order modes into the concentric region) can be achieved by techniques that are well known in the art. For example, the higher order mode power fraction may be boosted by designing a substantial central dip in the refractive index of the core, as shown in FIG. 12.

Figure 13:
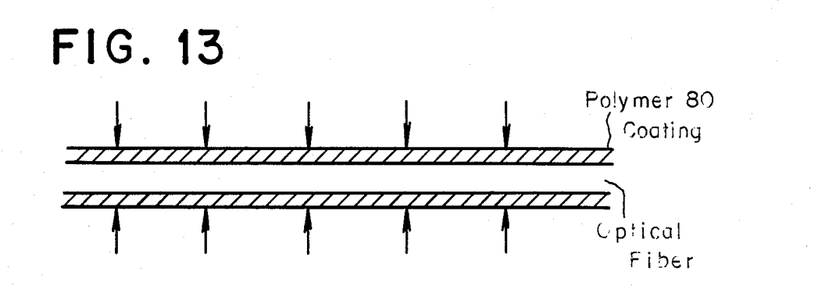
FIGS. 13 through 15 are illustrations of various applications for the pressure sensitive optical fiters of the invention.
Figure 14:
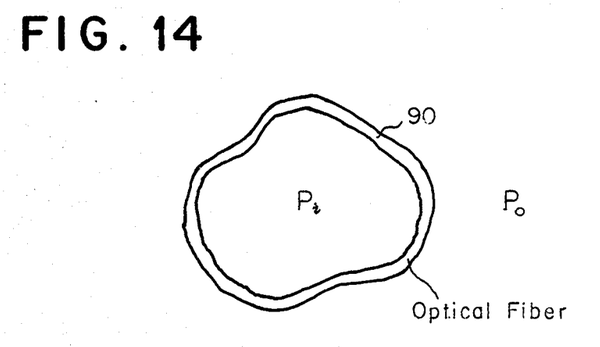
Figure 15:
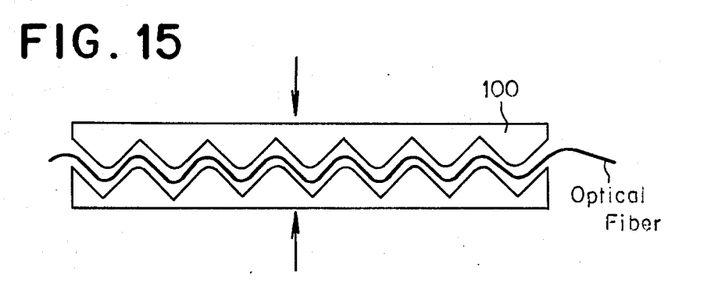

FIGS. 13–15 show applications for measuring pressure utilizing the pressure sensitive optical fiber of the invention. In FIG. 13, as shown, the isostatic pressure on the fiber induces microbends at local non-uniformaities in the polymer coating. The polymer coating 80 can be used as a buffer to enable the sensor to only detect pressures above a certain threshold value. The hardness or non-uniformities of the coating can be increased (or decreased) to raise (or lower) this threshold value.

In FIG. 14, the optical fiber pressure sensors of the invention 90 can be wound on a hollow flexible drum, the interior of which is exposed to gas or fluid pressure. As the pressure on the interior of the drum exceeds that on the exterior or, alternatively, as the pressure on the exterior of the drum exceeds that on the interior the fiber will experience macro- and microbending which then can be measured in the manner discussed above. Thus, the sensor can be used to measure internal (or external) pressure on a vessel. Also, the sensor can be used to prevent such pressure from exceeding a certain predetermined value by triggering a shutoff or bypass switch.

FIG. 15 illustrates a corrugated pressure plate 100 which can be used to translate a load or force F, into lateral bends on the optical fiber pressure sensor, which then can be measured in the manner described above.

Figure 16:
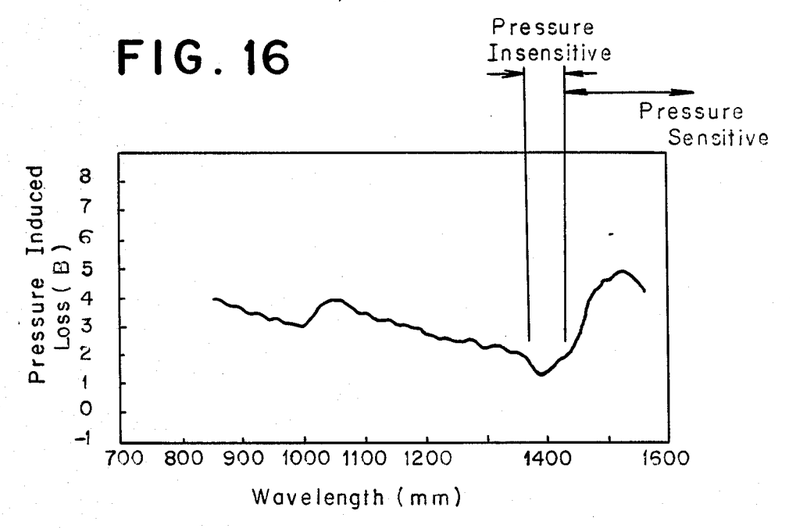
FIG. 16 is a spectral attenuation curve of experimentally induced loss in the optical fiber pressure sensor of FIG. 5.

FIG. 16, is a graph of an experimentally induced loss in the optical fiber pressure sensor of FIG. 5 when a two kilogram loading of flat parallel pressure plates is applied to two meters of that pressure sensor. As illustrated in the FIG., there is a relatively pressure insensitive region of the fiber and a pressure sensitive region. As mentioned above, those skilled in the art can adjust the width and sensitivity of these regions to best suit the intended needs and applications of the device.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

What is claimed is:

1. Pressure sensitive optical fiber comprising:
   core means at least a portion of which has a predetermined refractive index for transmitting light therethrough;
   cladding means adjacent said core means having a refractive index which is less than that of the core means portion; and concentric light transmissive means adjacent said cladding means having a refractive index which is greater than that of the cladding means and an internal diameter which is greater than the unperturbed mode boundary diameter of said core means such that all light passes through said core means portion when said optical fiber is unperturbed, and further, when said optical fiber is perturbed by pressure forces from stress or strain, light passes through said concentric light transmissive means in proportion to the amount of stress or strain induced in the fiber.

2. The fiber of claim 1 wherein the core means comprises single mode or multimode optical fiber.

3. The fiber of claim 1 wherein the core means comprises means for adjusting at least one of modal, waveguide and chromatic dispersion.

4. The fiber of claim 1 wherein the core means and cladding means comprises one of step index, graded index, depressed clad, deeply depressed clad, W-type and multiply clad optical fiber.

5. The fiber of claim 1 which further comprises means for transferring at least one of analog and digital data.

6. The fiber of claim 1, wherein the light transmissive means comprises a plurality of concentric layers.

7. A pressure sensor comprising:
pressure sensitive optical fiber having:
core means at least a portion of which has a predetermined refractive index for transmitting light therethrough;
cladding means adjacent said core means having a refractive index which is less than that of the core means portion; and
concentric light transmission means adjacent said cladding means having a refractive index which is greater than that of the cladding means and an internal diameter which is greater than the unperturbed mode boundary diameter of said core means such that all light passes through said core means portion when said optical fiber is unperturbed, and further, when said optical fiber is perturbed by pressure forces from stress or strain, light passes through said concentric light transmissive means in proportion to the amount of stress or strain forces induced in the fiber;
means for introducing optical power into one end of the optical fiber; and
means for detecting the optical power at the opposite end of the optical fiber.

8. The sensor of claim 7 wherein the detecting means comprises means for measuring the decrease in optical power in the core means.

9. The sensor of claim 7 wherein the detecting means comprises means for measuring the increase in optical power in the light transmissive means.

10. The sensor of claim 7 wherein the detecting means comprises means for measuring the decrease in optical power in the core means and means for measuring the increase in optical power in the light transmissive means.

11. The sensor of claim 7 further comprising means for modifying any external forces to bending forces on the fiber.

12. The sensor of claim 7 further comprising at least one coating on the optical fiber.

13. A method for detecting pressure which comprises:
installing pressure sensitive optical fiber in a location where pressure is contemplated for detection thereof, said pressure sensitive optical fiber comprising:
core means at least a portion of which has a predetermined refractive index for transmitting light therethrough;
cladding means adjacent said core means having a refractive index which is less than that of the core means portion; and
concentric light transmissive means adjacent said cladding means having a refractive index which is greater than that of the cladding means and an internal diameter which is greater than the unperturbed mode boundary diameter of said core means such that all light passes through said core means portion when said optical fiber is unperturbed, and further, when said optical fiber is perturbed, by pressure forces from stress or strain, light passes through said concentric light transmissive means in proportion to the amount of stress or strain induced in the fiber;
applying a light source at one end of the sensor; and
measuring optical power changes in at least one of said core means and said light transmissive means, thereby detecting pressure variations on the fiber.

14. The method of claim 13 which further comprises modifying the sensitivity of the fiber by applying at least one coating thereupon.

15. The method of claim 14 which further comprises varying the sensitivity of the fiber by varying at least one of the light transmissive means attenuation coefficient; the width of the light transmissive means; the core means attenuation coefficient; the width of the core means; the refractive index of the light transmissive layer; the refractive index of the core means; the distance of the spacing between the light transmissive means and the core means; and the shape of the refractive index profile.

16. Pressure sensitive optical fiber comprising:
core means comprising multimode fiber and having a predetermined refractive index for transmitting light therethrugh;
cladding means adjacent said core means having a refractive index which is less than that of the core means; and
concentric light transmissive means adjacent said cladding means having a refractive index which is greater than that of the cladding means and an internal diameter which is greater than the unperturbed mode boundary diameter of said core means such that all light passes through said core means when said optical fiber is unperturbed, and further, when said optical fiber is perturbed by pressure forces from stress or strain, light passes through said concentric light transmissive means in proportion to the amount of stress or strain induced in the fiber.

17. The fiber of claim 16 wherein the core means comprises means for adjusting at least one of modal, waveguide and chromatic dispersion.

18. A pressure sensor comprising:
pressure sensitive optical fiber having
core means comprising multimode fiber having a predetermined refractive index for transmitting light therethrough;

cladding means adjacent said core means having a refractive index which is less than that of the core means; and concentric light transmissive means adjacent said cladding means having a refractive index which is greater than that of the cladding means and an internal diameter which is greater than the unperturbed mode boundary diameter of said core means such that all light passes through said core means when said optical fiber is unperturbed, and further, when said optical fiber is perturbed by pressure forces from stress or strain, light passes through said concentric light transmissive means in proportion to the amount of stress or strain induced in the fiber;

means for introducing optical power into one end of the optical fiber; and means for detecting the optical power at the opposite end of the optical fiber.

19. A method for detecting pressure which comprises:

installing pressure sensitive optical fiber in a location where pressure is contemplated for detection thereof, said pressure sensitive optical fiber comprising:

core means comprising multimode fiber having a predetermined refractive index for transmitting light therethrough;

cladding means adjacent said core means having a refractive index which is less than that of the core means; and concentric light transmissive means adjacent said cladding means having a refractive index which is greater than that of the cladding means and an internal diameter which is greater than the unperturbed mode boundary diameter of said core means such that all light passes through said core means portion when said optical fiber is unperturbed, and further, when said optical fiber is perturbed, by pressure forces from stress or strain, light passes through said concentric light transmissive means in proportion to the amount of stress or strain induced in the fiber;

applying a light source at one end of the sensor; and measuring optical power changes in at least one of said core means and said light transmissive means, thereby detecting pressure variations on the fiber.

20. The method of claim 19 which further comprises varying the sensitivty of the fiber by varying at least one fo the light transmissive means attenuation coefficient; the width of the light transmissive means; the core means attenuation coefficient; the width of the core means; the refractive index of the light transmissive layer; the refractive index of the core means; the distance of the spacing between the light transmissive means and the core means; and the shape of the refractive index profile.

21. The method of claim 19 which further comprises modifying the sensitivity of the fiber by applying at least one coating thereupon.

22. Pressure sensitive optical fiber comprising:

core means having a predetermined refractive index for transmitting light therethrough;

cladding means adjacent said core means having a refractive index which is less than that of the core means;

concentric light transmissive means adjacent said cladding means having a refractive index which is greater than that of the cladding means and an internal diameter which is greater than the unperturbed mode boundary diameter of said core means such that all light passes through said core means portion when said optical fiber is unperturbed, and further, when said optical fiber is perturbed by pressure forces from stress or strain, light passes through said concentric light transmissive means in proportion to the amount of stress or strain induced in the fiber; and outer cladding means adjacent said concentric light transmissive means.

23. The optical fiber of claim 22 wherein the refractive index of the outer cladding means is at least equal to that of the concentric layer.

24. The optical fiber of claim 26 which further comprises an external coating upon said outer cladding means to vary the sensitivity of the fiber.

25. The optical fiber of claim 22 wherein at least one of the core means or outer cladding means further comprises an absorbing material to maximize attenuation of light transmission through said fiber.

26. The optical fiber of claim 22 wherein said core means comprises single mode of multimode optical fiber.

27. A pressure sensor comprising:

pressure sensitive optical fiber having:

core means having a predetermined refractive index for transmitting light therethrough;

cladding means adjacent said core means having a refractive index which is less than that of the core means;

concentric light transmissive means adjacent said cladding means having a refractive index which is greater than that of the cladding means and an internal diameter which is greater than the unperturbed mode boundary diameter of said core means such that all light passes through said core means when said optical fiber is unperturbed, and further, when said optical fiber is perturbed by pressure forces from stress or strain, light passes through said concentric light transmissive means in proportion to the amount of stress or strain induced in the fiber; and outer cladding means adjacent said concentric light transmissive means;

means for introducing optical power into one end of the optical fiber; and means for detecting the optical power at the opposite end of the optical fiber.

28. A method for detecting pressure which comprises:

installing pressure sensitive optical fiber in a location where pressure is contemplated for detection thereof, said pressure sensitive optical fiber comprising:

core means havign a predetermined refractive index for transmitting light therethrough;

cladding means adjacent said core means having a refractive index which is less than that of the core means;

concentric light transmissive means adjacent said cladding means having a refractive index which is greater than that of the cladding means and an internal diameter which is greater than the unperturbed mode boundary diameter of said core means such that all light passes through said core means when said optical fiber is unperturbed, and further, when said optical fiber is perturbed, by pressure forces from stress or strain, light passes through said concentric light transmissive means in proportion to the amount of stress or strain induced in the fiber; and outer cladding means adjacent said concentric light transmissive means;
applying a light source at one end of the sensor; and
measuring optical power changes in at least one of said core means and said light transmissive means, thereby detecting pressure variations on the fiber.

* * * * *